May 5, 1964
L. P. MacCOON
3,131,466
COMPRESSION BAND
Filed Oct. 31, 1960
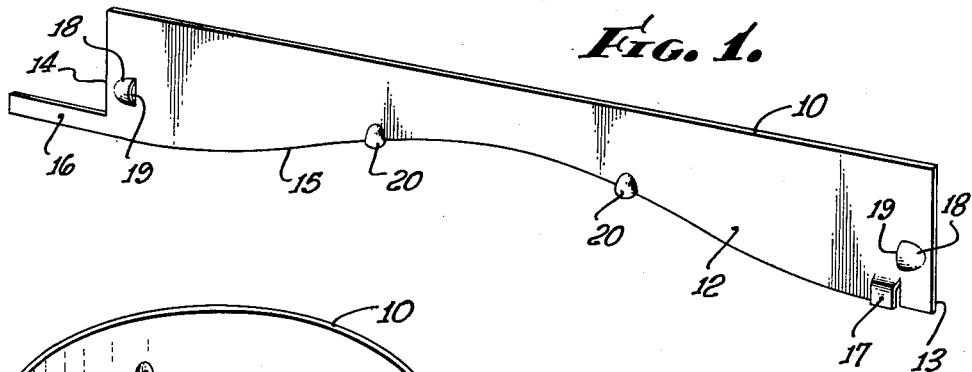
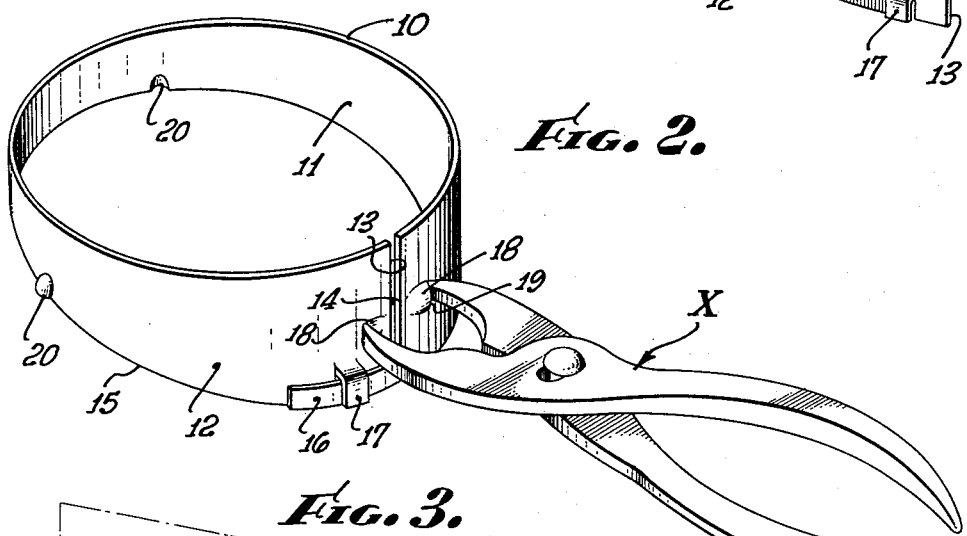
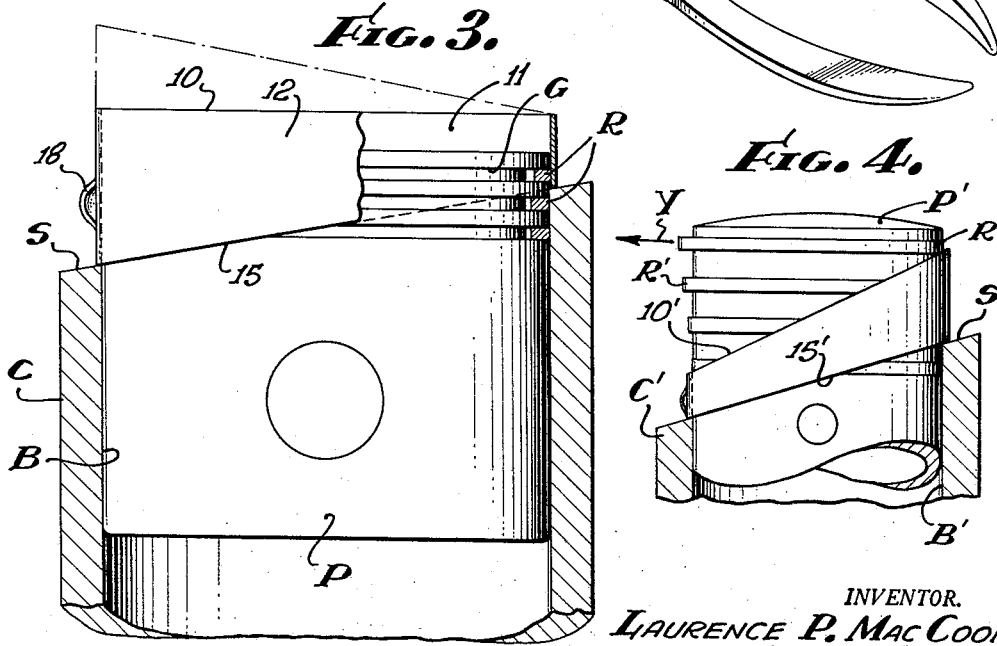
INVENTOR.
LAURENCE P. MacCOON
BY
George A. Maxwell
AGENT.

United States Patent Office 3,131,466
Patented May 5, 1964

3,131,466
COMPRESSION BAND
Laurence P. MacCoon, 241 N. Westmoreland Ave.,
Los Angeles, Calif.
Filed Oct. 31, 1960, Ser. No. 66,032
1 Claim. (Cl. 29—269)

This invention relates to an improved compression band and is more particularly concerned with a compression band for piston rings.

It is known in the art that when a piston is out of the cylinder with which it is to be related, and the piston rings have been put in place in the annular ring receiving grooves in the piston, the rings project radially outward beyond the surface of the piston, due to their natural expansion, and must be compressed into the grooves before the piston can be moved down into the cylinder.

It is also known that the ordinary piston ring is out of round when free and expanded and becomes round when it is compressed to a degree that it will slidably enter and engage with the wall of the cylinder.

It has been established that the ordinary piston ring construction is such that in order to compress it so as to permit it to be engaged, in a cylinder, it need not be engaged about its entire periphery, but need only be engaged about 180° of its peripheral extent.

The prior art has provided many devices to facilitate compressing piston rings preparatory to engagement of the piston, to which they are related, into a cylinder bore. The greater number and most successful devices for this purpose have involved flexible sheet metal bands formed of straight, flat strap of ribbon-like stock and which extend about the entire peripheral extent of the rings with which they are related. When these bands are engaged about a piston, they become straight, cylindrical members with straight, parallel top and bottom ends occurring in a plane normal to the longitudinal axis of the piston.

The band must not enter the bore and must engage and stop against the top surface of the cylinder block and so that the piston can be urged therefrom and transferred into the cylinder bore. In order that the transfer can be satisfactorily accomplished it is necessary that the bottom edge of the band establish flat bearing engagement with the cylinder block about its entire peripheral extent.

In recent years, it has become common practice, to mill or otherwise establish the top surface of the cylinder block of an internal combustion engine at an angle with respect to the central axes of the cylinder bores therein. This is generally done in connection with valve-in-head engines and in order to make possible better dispositioning of the firing chamber, ports and valve mechanisms related to the ports.

As a result of the above noted angular relationship between the top of the block and the cylinder bores, the ordinary piston ring compression band construction will not work, since the lower or bottom edge of the band cannot make uniform bearing engagement with the block. Instead, such a band will only make point contact with the head and with the result that it will bind, thereby establishing a lock and preventing shifting of the piston, or prematurely disengaging the rings, or scaring the piston.

An object of this invention is to provide an improved piston ring compression band for use in connection with engine constructions wherein the top of the cylinder block is angularly related to the axes of the cylinder bores therein.

A further object of my invention is to provide a structure of the character referred to which establishes uniform engagement about a piston and uniform engagement with the top surface of a cylinder block with which the piston is related and which is angularly disposed to the central axis of the piston.

Still another object of my invention is to provide a band of the general character referred to wherein the rings can be engaged in the piston and advanced into engagement in the band after the ring is engaged about the piston and is seated on the cylinder block.

Another object is to provide a band of the character referred to which can be applied to pistons of different diameters and which can be constructed around the piston and the rings by a pair of pliers, this requiring no special tools to operate it.

It is another object of my invention to provide stop means about the bottom edge of the band which will prevent the band from entering the cylinder bore, between the bore and the piston, when the space therebetween is greater than the thickness of stock from which the band is established.

A further object of my invention is to provide a band of the character referred to wherein both ends are angularly related to the axis of the piston and so that one band can be used to engage pistons in at least two engine designs having the tops of their block angularly related to the axis of the cylinder bores.

The various objects and features of my invention will be fully understood from the following detailed description of typical preferred forms and applications of my invention, throughout which description reference is made to the accompanying drawings, in which:

FIG. 1 is a perspective view showing one form of my new piston ring compression band in an extended condition.

FIG. 2 illustrates how a pair of pliers can be used to compress the band after it has been placed around a piston.

FIG. 3 is a vertical sectional view through a cylinder wall, with the piston and piston rings in place and ready to be moved down into the cylinder, and with the compression band in place, parts being broken away to more clearly show the operation thereof.

FIG. 4 is a view similar to FIG. 3 and showing another form of the invention.

In FIGS. 1 to 3 of the drawings, my new compression band is shown as involving an elongate strap or ribbon of sheet metal having a straight, longitudinal horizontally disposed top edge 10, flat, vertically disposed inner and outer surfaces 11 and 12, vertically disposed ends 13 and 14 and a curved, downwardly disposed bottom edge 15.

The end 14 is provided with an elongate extension or finger 16 adjacent the lower edge and projecting longitudinally from the end of the band. The bottom edge 15 of the band is lanced, vertically to a limited extent, at two points spaced longitudinally from the end 13 and the stock between the lances is formed or pressed out to establish a downwardly projecting tongue 17 spaced outwardly from the outside surface 12 and terminating adjacent the bottom edge of the band.

In addition to the foregoing, the band is further provided at its opposite end portions with outwardly projecting, lug-like projections 18, each having a straight, vertical edge 19 disposed inwardly towards the center of the band and so that when the band is bent so as to bring the ends 13 and 14 in opposed relationship, the edges 19 are oppositely disposed.

The lugs 18, like the tongue 17, project from the outer surface of the band and are arranged intermediate the top and bottom edges of the band.

The lugs 18 are preferably formed integrally with the band by a suitable lancing and punching operation.

The band is further provided with a plurality of outwardly projecting stops 20 along the bottom edge 15 formed as by dimpling and which serves to engage the top surface of the cylinder block and to prevent the band from entering a cylinder bore, around the piston, when the space between the bore and piston is excessive.

In operation, the band is bent so as to bring the ends 13 and 14 into opposed relationship, the finger extension is arranged adjacent the outer surface of the band to extend between the band and the tongue 17. The lug edges 19 of the lugs 18 are engaged by the jaws of a pair of pliers X, as clearly illustrated in FIG. 2 of the drawings.

The bottom edge 15 of the band is curved so that when it is bent into tubular form, the bottom edges thereof are flat and occur on a plane angularly related to the horizontal plane of the top 10 and the central axis of the tube.

It will be apparent by suitable curving or contouring the bottom edge of the band, the bottom edge thereof can be made to occur in any flat, fixed, predetermined plane when the band is bent into tubular form.

The band is then engaged about the upper end of a piston P having a plurality of expanded piston rings R engaged in ring receiving grooves G in the piston and so that each ring is engaged by the band about its entire circumferential extent.

The lower end of the piston is then slidably engaged in an upwardly opening bore B in a cylinder block C, having a flat top surface S which is inclined to the central axis of the bore to the same degree that the bottom 15 of the band is inclined to the central axis of the band when it is formed into a ring.

The piston with the band engaged thereabout is then urged downwardly into the bore and is rotated, or the band is rotated, until the band establishes uniform bearing engagement on the top S of the block.

When the structures are related in the above manner, the band is compressed about the piston by the pliers so as to compress the rings. After the rings are compressed, the finger is bent out to lock the band in compressed position and the pliers can be removed.

After the band is set in the above manner, the upper portion of the piston, with the rings, is urged, by pressure, downwardly out of engagement with the band and into the cylinder bore.

It is to be noted that the band is of greatest vertical extent at its ends, where it is split and therefore needs the greatest support and also where sufficient stock is provided to establish the lugs 18, tongue 17 and finger 16. The central portion of the band, where it is of the least vertical extent, is uninterrupted.

The above relationship of parts, in addition to establishing the strongest and most serviceable construction, also facilitates orienting the band about the piston and relative to the block and bore therein, since the split will always occur at the lowermost point about the upper edge of the cylinder bore.

Once the band has been used, the finger 16 can be straightened out and the band is ready for use again.

In the form of the invention shown in FIG. 1, the top edge of the band is horizontally disposed; accordingly, if desired, the band can be turned over and used in connection with an engine construction where the top surface of the block is normal to the axis of the cylinder bore.

In the form of the invention shown in FIG. 4, the bottom edge 15' is disposed at one angle to the axis of the cylinder bore B' and piston P' to establish flat engagement with the angularly disposed top surface S' of the cylinder block C', and the top edge 10' is disposed at another angle; in the case illustrated, at a more acute angle than the bottom edge.

In this second form of the invention, it will be apparent that the band can, by simply turning it over, be used in connection with two different engine designs wherein the tops of the blocks are inclined at different angles with respect to the bore.

In the form of the invention shown in FIG. 4, the top and bottom edges 10' and 15' are pitched in the same direction. It will be apparent, however, that they could be pitched in opposite directions, as indicated in dotted lines in FIG. 3 of the drawings.

Still further, where the uppermost or top edge is a "sufficiently steep" angle, the rings need not be initially engaged by the band, but can be urged downwardly into engagement therein. That is by initially shifting each expanded ring in the direction indicated by the arrow Y in FIG. 4, so that the portion of the ring adjacent the uppermost part of the band is within its related groove and will enter the band freely, the piston can be urged downwardly through the band and the inclined upper edge of the band, by virtue of the principle of the inclined plane, progressively increases its engagement about the ring and compresses it in the desired manner and to the desired extent.

It will be apparent that in this second form of the invention, the ring need not be split in order to be engaged about the piston and rings.

It is recognized that the above function can only be accomplished where the plane in which the top edge of the band is, is at a steep angle and therefore would have little application so far as a reversible band is concerned, however, if desired, the top edge of the band can be inclined to accomplish the above results, per se.

Having described only typical preferred forms and applications of my invention, I do not wish to be limited or restricted to the specific details herein set forth, but wish to reserve to myself any modifications or variations that may appear to those skilled in the art and fall within the scope of the following claim.

Having described my invention, I claim:

A piston ring compression band comprising an elongate strap of sheet material bendable to dispose the ends of the strap in opposed relationship and define inner and outer cylindrical walls, said strap having a curved edge defining an elliptical edge of said cylindrical walls disposed on a flat plane oblique to the central axis of the cylindrical walls, a tongue projecting from the outer cylindrical wall adjacent one end of said strap, an elongate finger projecting from the opposite end of the strap for hooked engagement with said tongue to maintain the strap in cylindrical configuration, a tool engaging lug projecting from the outer cylindrical wall adjacent each of said ends, and stop means projecting from the outer cylindrical wall along said elliptical edge.

References Cited in the file of this patent

UNITED STATES PATENTS

| | | |
|---|---|---|
| 1,444,072 | Holland | Feb. 6, 1923 |
| 1,479,434 | Nelson | Jan. 1, 1924 |
| 2,883,741 | Yerkes | Apr. 28, 1959 |